United States Patent [19]
Franklin

[11] 4,389,001
[45] Jun. 21, 1983

[54] INTERFACE CONTROL CIRCUIT FOR MULTIPLE HOT MELT MATERIAL SUPPLY SYSTEMS

[75] Inventor: Jerry C. Franklin, Castroville, Calif.

[73] Assignee: Lockwood Technical, Inc., Monterey, Calif.

[21] Appl. No.: 263,178

[22] Filed: May 13, 1981

[51] Int. Cl.³ .............................................. B67D 5/62
[52] U.S. Cl. ........................................ 222/63; 222/66; 222/261
[58] Field of Search .................... 222/1, 52, 63, 64, 65, 222/66, 70, 135, 260, 261

[56] References Cited

U.S. PATENT DOCUMENTS

| | | | |
|---|---|---|---|
| 3,147,884 | 9/1964 | Sacco | 222/61 X |
| 3,430,812 | 3/1969 | Leo et al. | 222/261 X |
| 3,637,111 | 1/1972 | McCreary | 222/261 X |
| 3,976,229 | 8/1976 | Jackson | 222/261 X |
| 4,247,018 | 1/1981 | Credle | 222/64 X |
| 4,355,734 | 10/1982 | Moore | 222/64 X |

Primary Examiner—David A. Scherbel
Assistant Examiner—Jan Koniarek
Attorney, Agent, or Firm—Thomas H. Olson

[57] ABSTRACT

An interface circuit for effecting switchover between plural hot melt material delivery systems so that hot melt material can be continuously supplied to applicators or the like. There are two similar relay circuits which are interconnected so that upon depletion of hot melt material from one system, operation is automatically transferred to another system. The relay circuits each include disconnect contacts for disconnecting the depleted system, transfer contacts for activating the new system, lock-out contacts for preventing operation of the system that is not activated and lock-in contacts for activating the new system without attention by the system operator. The coil of the disconnect relay can be connected to a delay circuit so that deactivation of the depleted system can be delayed by delay interval after activation of the new system. The delay circuit affords a fixed delay interval or a variable delay interval.

4 Claims, 4 Drawing Figures

INTERFACE CONTROL CIRCUIT FOR MULTIPLE HOT MELT MATERIAL SUPPLY SYSTEMS

BACKGROUND OF THE INVENTION

1. Field of the Invention

This invention relates to hot melt material delivery systems and more particularly to a switching circuit for effecting automatic switch over between two such systems without loss of continuous flow and/or continuous pressure.

2. Description of the Prior Art

High volume users of hot melt adhesive and like hot melt material typically purchase the material in 55 gallon drums and unload the drums with equipment such as described in U.S. Pat. Nos. 2,522,652; 3,031,106; 3,282,469; 4,073,409; 4,144,986 and 4,195,755. The cited patents typify drum unloaders that include a heated platen having a shape corresponding to the interior shape of a 55 gallon drum, driving mechanism for urging the heated platen into a drum and a motor driven pump for removing hot melt material after it is melted by the heated platen. The melted hot melt material is conveyed through heated hoses to a manifold from which the material is supplied to applicators such as guns, rollers, and the like.

In certain environments, such as on a high speed assembly line, it is desirable that a continuous supply of hot melt material be available, and in such environments it is customary to provide two or more drum unloaders and to operate them alternately so that while one is delivering hot melt material, a full drum can be installed in the other.

The timing of the switch over from one system to the other is critical, particularly in situations where continuous delivery of hot melt material is essential. If the system with a full drum is activated prematurely, a pressure surge can occur in the manifold to which the material is delivered and this can cause the applicators to apply excessive hot melt material during the surge. Contrariwise, if activation of the system with a full drum is unduly delayed, there can be a period of interruption of delivery of hot melt material to the applicators.

SUMMARY OF THE INVENTION

The present invention provides an interface control circuit for use with two or more hot melt delivery systems; the circuit is designed to respond to depletion of hot melt material in one system, to deactivate the one system and to activate the other system. The interface circuit can effect simultaneous activation and deactivation, or can delay deactivation for a suitable delay interval so as to avoid any loss of pressure within the manifold supplied by the two systems.

The interface circuit is provided with lockout switches which prevent simultaneous activation of two hot melt material systems except during the period of the delay interval referred to above.

Typical electrical control circuits that form a part of most hot material delivery systems employ various control switches and/or push buttons; the interface circuit according to the invention is adapted to be accommodated into such control circuits without material alterations of the same.

The foregoing, together with other objects, features and advantages of the invention will be more apparent after referring to the following specification and the accompanying drawings.

DETAILED DESCRIPTION OF A PREFERRED EMBODIMENT

Figure 1:
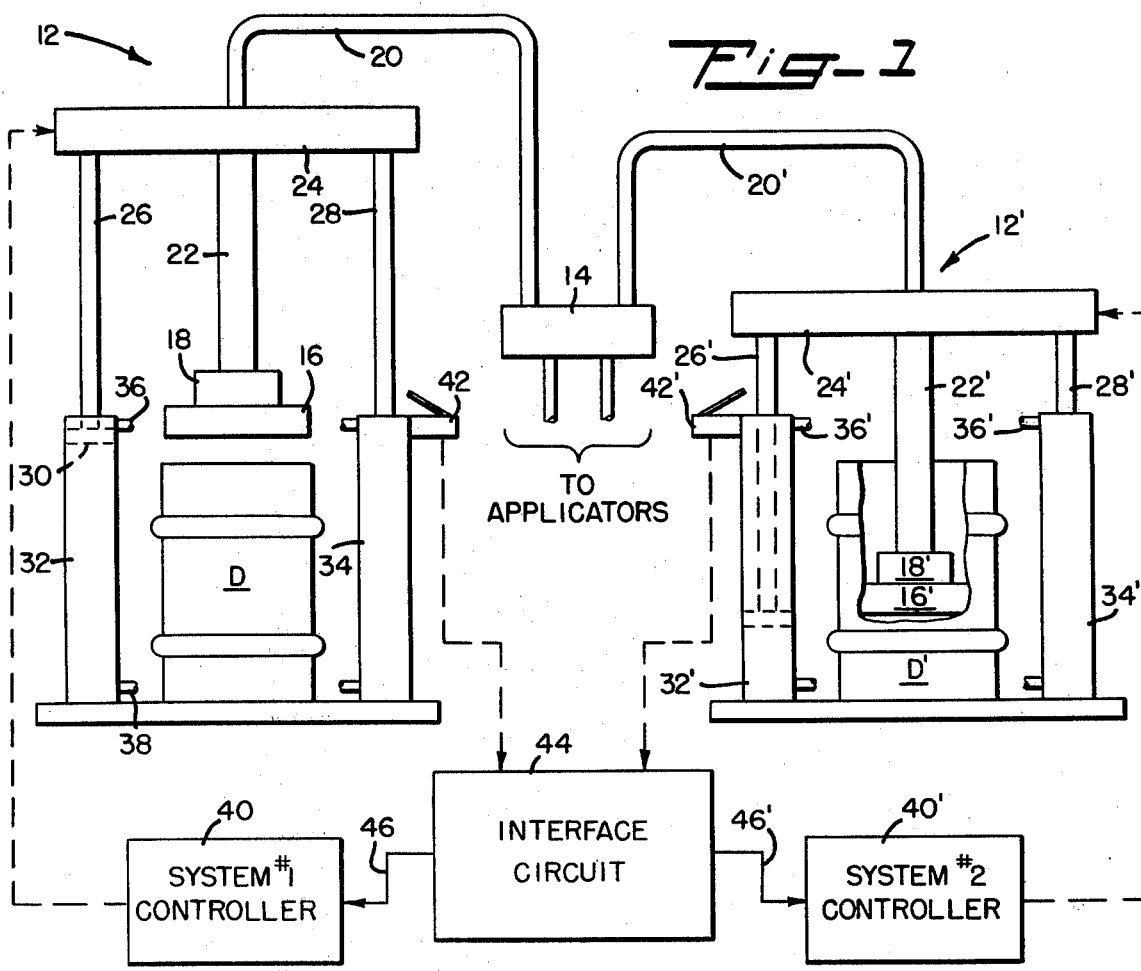
FIG. 1 is a partially schematic view showing two hot melt material delivery systems.

Referring more particularly to the drawings, FIG. 1 shows a first hot melt material delivery system 12 and a second hot melt material delivery system 12', which are of known configuration as exemplified in the previously cited patents. Each material delivery system functions to unload hot melt material from a drum D and to deliver the hot melt material in molten flowable form to a manifold 14 from which the material is delivered to applicators of known form. Because hot melt delivery systems 12 and 12' are identical, a description of one will suffice for description of both, it being noted that corresponding elements in system 12' employ reference numerals to which a prime ("'") is appended.

More specifically, each system includes a heated platen 16 which has a peripheral shape corresponding to the interior cross-sectional shape of drum D, typically circular in systems adapted to unload conventional 55 gallon drums. Platen 16 includes heating elements so that the lower surface of the platen is capable of melting the hot melt material in drum D as the platen is forced into the drum. Platen 16 has affixed thereto a pump and a motor for driving the pump, such pump and motor being indicated schematically at 18. The pump has an inlet which communicates with the melted hot melt material in drum D so that as the material is melted it is pumped from the drum. The pump also has an outlet connected to a heated hose 20. The outlet of the heated hose constitutes the inlet to manifold 14. Platen 16 and pump/motor 18 are mounted on the lower end of a rigid plunger 22. The upper end of plunger 22 is rigidly connected to a cross beam 24. Opposite ends of the cross beam are fastened to the upper end of rods 26 and 28 which are fastened to pistons, an exemplary one of which is seen at 30; the pistons form a part of hydraulic or pneumatic actuators 32 and 34. Each actuator has an upper fluid inlet 36 and a lower fluid inlet 38 to which pressurized fluid is controllably supplied to raise or lower platen 16 with respect to drum D. Suitable valves for controllably supplying the fluid are included in a typical system but are not shown here, it being sufficient for the present disclosure to note that hot melt delivery system 12 has a controller 40 and hot melt material delivery system 12' has a controller 40' which, among other things, have provisions for controlling the flow of pressurized fluid into and the discharge of pressurized fluid from actuators 32 and 34. There is a sensor in the form of a limit switch 42 which is arranged to sense the position of platen 16 at or near the bottom wall of drum D; limit switch can include contacts which are closed when the platen reaches the bottom of the drum. Sensors 42 and 42' are coupled to an interface circuit 44 which in constructed in accordance with the invention. As will appear in more detail hereinafter, interface circuit 44 has a control path 46 for supplying control signals to controller 40 and a control path 46' for applying control signals to controller 40'. With the exception of interface circuit 44, all elements disclosed to this point are conventional and are exemplified in the U.S. patents previously cited.

Figure 2:
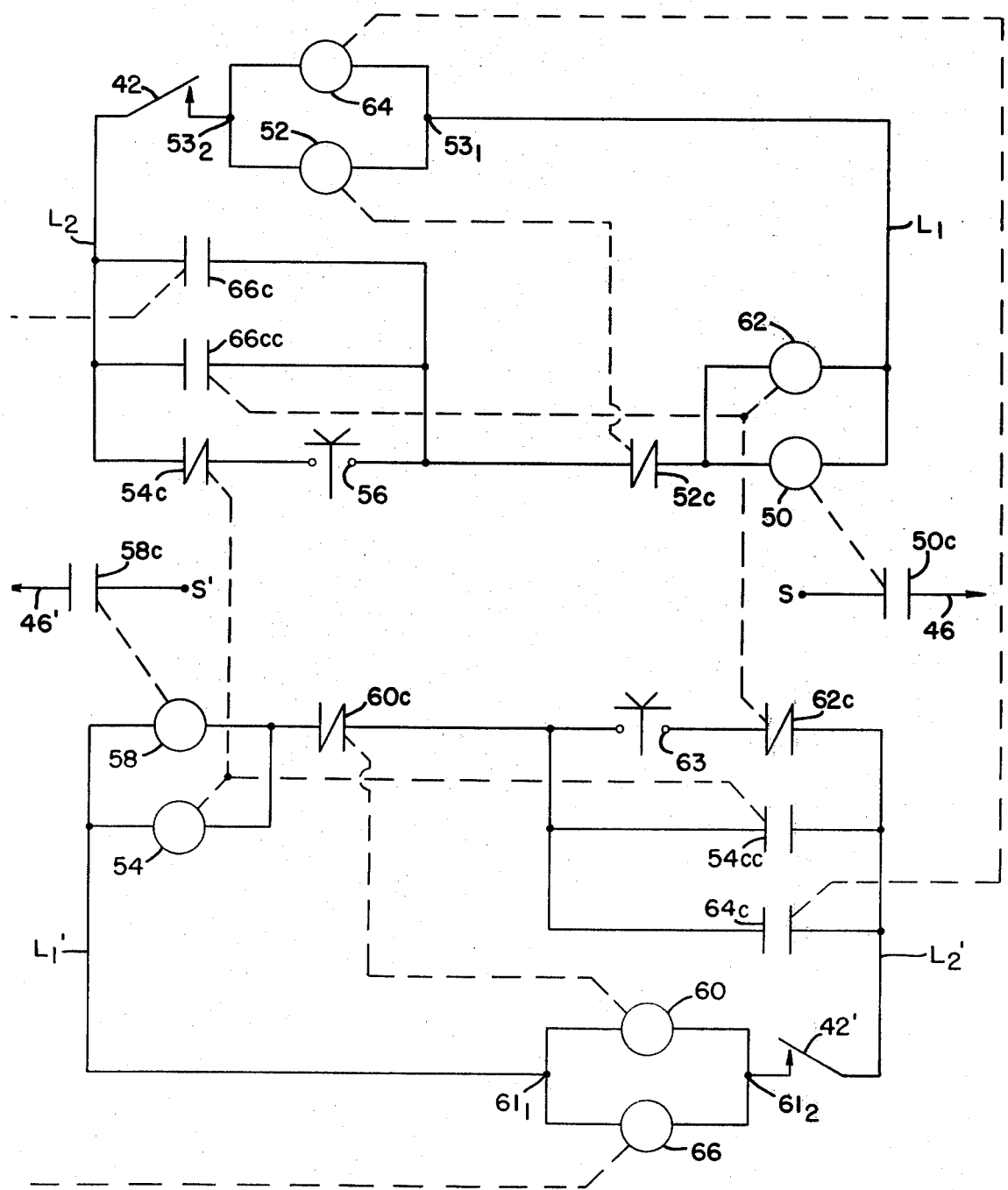
FIG. 2 is a schematic diagram of a preferred embodiment of an interface circuit according to the invention.

An exemplary circuit arrangement for interface circuit 44 is shown in FIG. 2. The circuit has an upper portion for controlling the signal applied to control path 46 and an identical lower portion for controlling the signal applied to control path 46'; the circuit portions are interconnected as will be described below.

Circuit path 46 is connected to a normally open contact $50c$ which is associated with a relay coil 50, the contact $50c$ being open until the coil 50 is energized and remaining closed so long as the coil is energized. The side of contact $50c$ opposite from circuit path 46 is connected to a control signal source S which can be a voltage or current sufficient to activate controller 40. Relay coil 50 and other relay coils to be described are powered by a power source having a power line $L_1$ which constitutes one side of the power source and a power line $L_2$ which constitutes the opposite side of the power source. The voltage between power lines $L_1$ and $L_2$ can be any voltage such as 120 volts AC or whatever other voltage may be conveniently available. Relay coil 50 is connected between lines $L_1$ and $L_2$ through a normally closed disconnect contact $52c$, a normally closed lockout contact $54c$ and a normally open push button switch 56. Disconnect contact $52c$ is associated with a relay coil 52 which is connected between circuit junctions $53_1$ and $53_2$. Lock-out contact $54c$ is associated with a realy coil 54. Also associated with relay coil 54 is a lock-in contact $54cc$.

The circuit associated with control circuit path 46' is substantially identical to that described in the immediately preceding paragraph in that there is a normally open contact $58c$ which is associated with a relay coil 58. One side of contact $58c$ is connected to circuit control path 46' and the opposite side of the contact is connected to a control signal source S' which can be similar to control signal source S. Relay coil 58 is connected to a line $L_1'$ which is one side of a power source that has an opposite side $L_2'$. Relay coil 58 is connected between power lines $L_1'$ and $L_2'$ through a normally closed disconnect contact $60c$, a normally closed lockout contact $62c$ and a normally open pushbutton switch 63. Disconnect contact $60c$ is associated with a relay coil 60 which is connected between circuit junctions $61_1$ and $61_2$. Lock-out contact $62c$ is associated with a relay coil 62 with which is also associated a normally open lock-in contact $62cc$.

In shunt with relay coil 52 between circuit junctions $53_1$ and $53_2$ is a relay coil 64 which has associated with it a normally open transfer contact $64c$. Similarly, in shunt with relay coil 60 and connected between circuit junctions $61_1$ and $61_2$ is a relay coil 66 which has associated with it a normally open transfer contact $66c$.

Description of the operation of the circuit of FIG. 2 will commence with the assumption that both hot melt delivery systems 12 and 12' are in an inactive position exemplified by system 12 as depicted in FIG. 1. Circuitry within system controller 40' is activated to move platen 16' into contact with the hot melt glue disposed in barrel D. After a suitable start up delay provided by system controller 40', pushbutton contact 63 is closed by the operator of the system and relay coil 58 is energized so as to close contact $58c$. The resulting signal applied on path 46' causes activation of pump/motor 18' and application of suitable fluid pressure to actuator inlet 36' so that hot melt material is delivered through hose 20' to manifold 14. Closure of contact 63 also energizes lock relay coil 54 which closes lock-in contacts $54cc$ so that relay coil 58 remains energized after release of pushbutton contact 63. Energization of coil 54 also opens lock-out contact $54c$ so as to prevent control path 46 from being activated. As delivery of hot melt material through hose 20' continues, platen 16' moves downward within drum D to and beyond the position indicated in FIG. 1. The downward movement of the platen is controlled by system controller 40' in accordance with conventional practice. When platen 16' reaches a position at or near the bottom wall of drum D, sensor or limit switch 42' is closed and relay coils 60 and 66 are thereby energized. Energization of relay coil 60 opens disconnect contact $60c$ which in turn deenergizes relay 58 so that contact $58c$ opens to terminate the control signal on control path 46'. In response to termination of the control signal, system controller 40' deactivates hot melt delivery system 12'. Energization of relay coil 66 in response to closure of sensor contact 42' closes transfer contacts $66c$, thereby completing a circuit between power lines $L_1$ and $L_2$ so as to energize relay coil 50 and close contact $50c$. In response to the foregoing a control signal is applied to control path 46 and hot melt delivery system 12 is activated. Closure of contact $66c$ also energizes relay coil 62 which causes closure of lock-in contact $62cc$ and opening of lock-out contact $62c$. The latter prevents energization of relay coil 58 and closure of contact $58c$ during operation of hot melt delivery system 12.

While system 12 delivers hot melt material to manifold 14, a new drum D of hot melt material can be installed in system 12' and readied for use, so that when platen 16 nears the bottom wall of drum D and sensor 42 is operated, the system will switch back to hot melt delivery system 12'. Accordingly, a substantially continuous supply of hot melt material is supplied to manifold 14 without requiring significant attention by the system operator.

Figure 3:
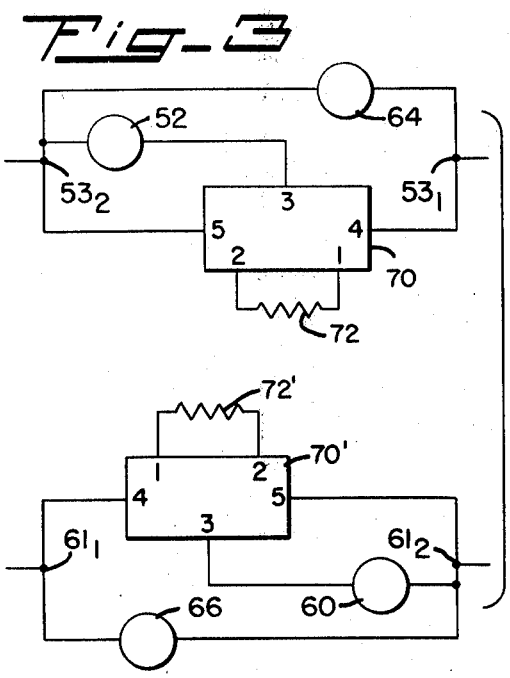
FIG. 3 is a schematic diagram of a fragment of FIG. 2 showing a modification.

The fragment of the circuit shown in FIG. 3 includes time delay circuits associated with relay coils 52 and 60 so that the system from which hot melt material is almost depleted is not disconnected until the newly activated system has been running for a finite time equal to a delay time. More particularly, in series with relay coil 52 is a time delay element 70 which is a conventional element such as a solid state delay device marketed under the trade name Omnetics as Part No. MJS-115A-5-N-60. Such component provides a delay that has a duration proportional to the value of a resistor 72 that is connected to appropriate terminals on the device so that after closure of sensor 42, coil 52 will not be energized (and disconnect contact $52c$ will not be opened) until expiration of such delay time. A typical desirable delay period is 5 seconds and to achieve a delay of this duration in one system designed according to the invention, resistor 72 has a value of 240 K ohms.

Relay 60 has an equivalent delay device which will not be explained further except to note that the time delay element in series with relay coil 60 is indicated at 70' and the timing resistor associated therewith is indicated at 72'.

With the circuit modification shown in FIG. 3 when sensor 42 is closed in response to depletion of hot melt material from hot melt material system 12, relay 64 is immediately energized so as immediately to close transfer contact 64c to energize relay coil 58 and apply a control signal on control path 46'. After the delay time (e.g. 5 seconds) relay coil 52 is energized so as to open disconnect contact 52c and deactivate the now depleted hot melt material delivery system 12. With a modification shown in the circuit of FIG. 3, a continuation of positive pressure in manifold 14 is assured so that if the applicators that are supplied by the manifold are continuously running ones, the switch-over will not cause any disruption in the smooth delivery of the hot melt material to the applicators.

Figure 4:
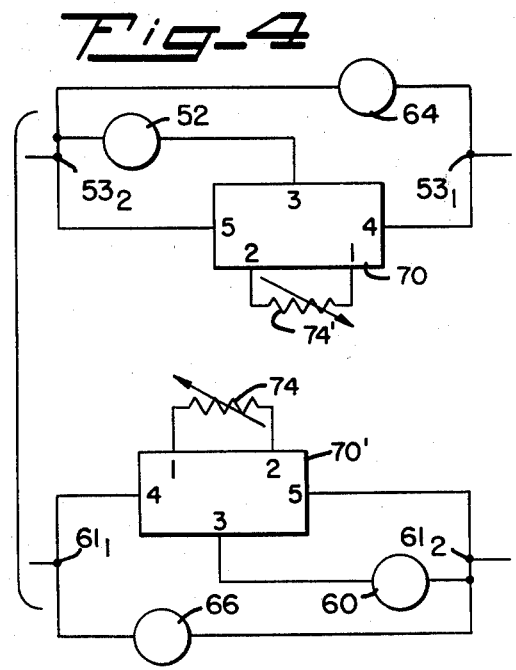
FIG. 4 is a schematic diagram similar to FIG. 3 showing another modification.

In the circuit modification of FIG. 4 fixed resistors 72 and 72' are replaced by variable resistors or potentiometers 74 and 74'. The variable resistor is used with a time delay element 76 which is identical to time delay element 70 described above in connection with FIG. 3. The presence of the variable resistor affords variation of the delay time between the activation of one of the hot melt material delivery systems and the deactivation of the other one. Variation in the delay is desirable in installations where different types of hot melt materials having different flow characteristics may be used at different times. The optimum time delay for one type of material may be different from the optimum delay type or different, and variable resistors 74 and 74' afford variation of time delay so that the optimum time delay can be established.

Thus it will be seen that the present invention provides an interface circuit for interfacing plural hot melt glue delivery systems so that when hot melt material is depleted from one of the systems another system will be automatically activated. The interface circuit is arranged so that activation and deactivation can occur simultaneously or so that deactivation can be delayed for several seconds after activation of a new system in order to assure smooth and continuous delivery of hot melt material before, during and after the switchover. Although one embodiment of the invention has been shown and described, it will be obvious that other adaptations and modifications can be made within the true spirit and scope of the invention.

What is claimed is:

1. Apparatus for switching between a first system for delivering hot melt material and a second system for delivering hot melt material wherein each system includes a pump for pumping hot melt material, a motor for driving the pump, controller means for controllably energizing the motor, and a sensor for sensing when the hot melt material has been depleted, and wherein there is a manifold and means connecting the pump outputs to said manifold for affording delivery of hot melt material to said manifold, said apparatus comprising a first circuit having first means for activating said controller means of said first system and a second circuit having second means for activating said controller means of said second system, a first locking element having a first energizer in said first circuit in shunt with said first activating means, a first normally open lock-in contact operably coupled to said first energizer and connected in said first circuit in series with said first activating means so that when said first energizer is energized said first activating means is locked in, said first locking element having a first normally closed lock-out contact in said second circuit in series with said second activating means so that when said first energizer is energized said second activating means is locked out, a second locking element having a second energizer in said second circuit in shunt with said second activating means, a second normally open lock-in contact operably coupled to said second energizer and connected in said second circuit in series with said second activating means so that when said second energizer is energized said second activating means is locked in, said second locking element having a second normally closed lock-out contact in said first circuit in series with said first activating means so that when said second energizer is energized said first activating means is locked out, a first normally closed disconnect contact in series in said first circuit and means responsive to the sensor in said first system for opening said first disconnect contact to deactivate said first system when hot melt material has been depleted therefrom, a first normally open transfer contact in shunt with said second lock-in contact of said second locking element and means responsive to the sensor in said first system for closing said first transfer contact in response to hot melt material in said first system being depleted so as to activate said second system, and a second normally closed disconnect contact in series in said second circuit and means responsive to the sensor in said second system for opening said second disconnect contact to deactivate said second system when hot melt material has been expended therefrom, a second normally open transfer contact in shunt with said first lock-in contact of said first locking element, and means responsive to the sensor in said second system for closing said second transfer contact in response to hot melt material in said second system being depleted so as to activate said first system, whereby on hot melt glue being depleted from one of said systems the other of said systems is activated to afford substantially continuous delivery of hot melt material to said manifold.

2. Switching apparatus according to claim 1 including first and second delay means operatively connected to respective said sensors and respective said disconnect contact opening means for establishing a delay between activation of one said system and deactivation of the other said system so that pressure of hot melt material in said manifold is substantially continuously maintained.

3. Switching apparatus according to claim 2 wherein said delay establishing means establishes a delay of about five seconds.

4. Switching apparatus according to claim 2 wherein said delay establishing means includes means for varying the delay from about zero seconds to about ten seconds.

* * * * *